(No Model.)

M. W. LOWES.
ELASTIC HORSESHOE.

No. 586,558.

Patented July 20, 1897.

Witnesses
T. L. Mockabee
J. F. Riley

Inventor
Mathew W. Lowes

By his Attorneys.
C. A. Snow & Co.

United States Patent Office.

MATHEW WALTON LOWES, OF MARINE CITY, MICHIGAN.

ELASTIC HORSESHOE.

SPECIFICATION forming part of Letters Patent No. 586,558, dated July 20, 1897.

Application filed September 16, 1896. Serial No. 606,052. (No model.)

*To all whom it may concern:*

Be it known that I, MATHEW WALTON LOWES, a citizen of the United States, residing at Marine City, in the county of St. Clair and State of Michigan, have invented a new and useful Horseshoe, of which the following is a specification.

The invention relates to improvements in horseshoes.

The object of the present invention is to improve the construction of horseshoes and to provide a simple, noiseless, and comparatively inexpensive one designed to relieve a horse from shocks and concussions and not interfere with the growth of the hoof and adapted to prevent interfering and overreaching and avoid any liability of striking the hind shoes against the fore shoes and loosening or pulling off the latter.

A further object of the invention is to provide a shoe which will prevent a horse from slipping and obviate the necessity of employing calks for that purpose, and thereby avoid any liability of a horse injuring itself with calks.

The invention consists in the construction and novel combination and arrangement of parts hereinafter fully explained, illustrated in the accompanying drawings, and pointed out in the claim hereto appended.

Figure 1:
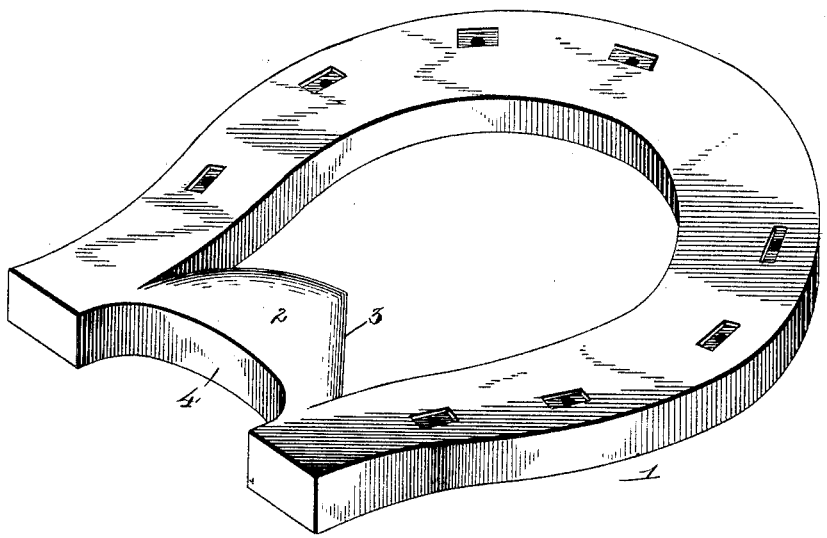
Figure 2:
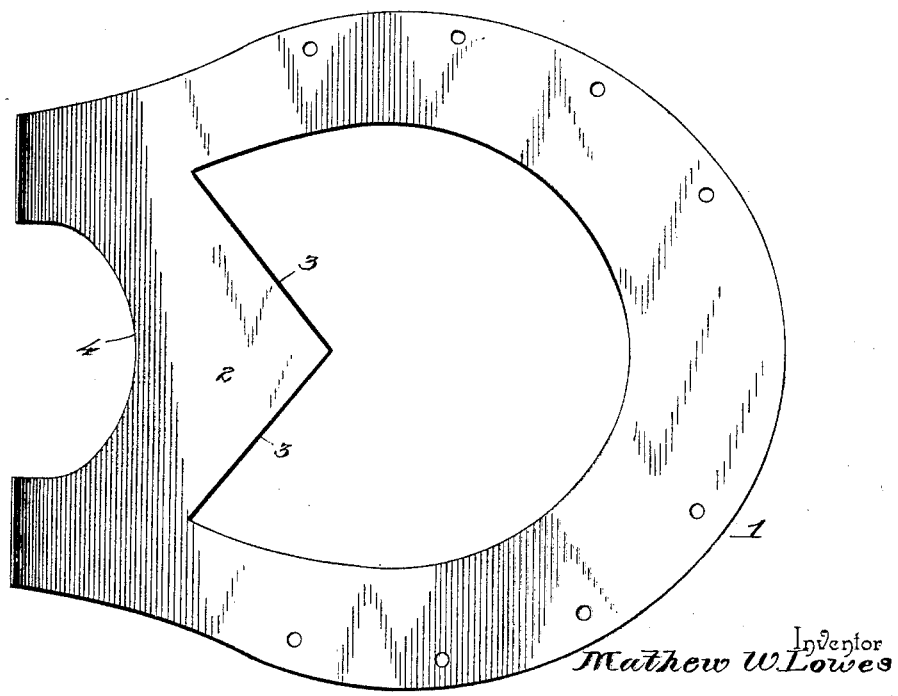

In the drawings, Figure 1 is a perspective view of a horseshoe constructed in accordance with this invention and showing the lower or outer face thereof. Fig. 2 is a plan view showing the upper or inner face of the shoe.

Like numerals of reference designate corresponding parts in both the figures of the drawings.

1 designates an elastic horseshoe of the ordinary configuration, constructed of rubber or similar material and provided adjacent to the rear ends of its sides with a cross-piece or frog 2, adapted to protect the frog of the hoof and to connect the sides of the shoe and assist in returning them to their normal position should they become spread. The cross-piece or frog 2, which is constructed of rubber similar to the shoe, is formed integral with the same, and it is substantially rectangular, presenting straight angularly-disposed front edges 3 and having a concavely-curved rear edge 4, located slightly in advance of the rear ends of the sides of the shoe.

At its rear or concavely-curved edge the cross-piece or frog is of the same thickness as the sides of the shoe and has its upper and lower faces at that point flush with the upper and lower faces of the shoe, and it has its lower or outer face beveled toward its front extremity or apex to avoid offering any obstruction to the movement of the hoof of a horse and to enable the interior of the shoe to be readily cleaned and to a great extent prevent any accumulation from collecting therein.

The sides of the shoe are provided with nail holes or perforations having enlarged outer or lower terminals to partially countersink the heads of the nails.

The horseshoe is elastic to relieve a horse of shocks and concussions. It is noiseless, and as it will prevent a horse from slipping it obviates the necessity of employing calks for this purpose and avoids injury to a horse by the use of the same. It is also adapted to prevent a horse from striking its hind hoofs against its fore hoofs and loosening or pulling off a shoe. The shoe is adapted to spread and yield, so as not to interfere with the growth of a hoof, and the cross-piece or frog assists in retaining the sides of the shoe in their normal position and at the same time does not interfere with the spreading or expanding of the shoe.

Having described my invention, what I claim is—

A horseshoe constructed entirely of rubber, and provided adjacent to the rear ends of its sides with a substantially triangular cross-piece or frog yieldingly connecting the sides of the shoe, and having angularly-disposed straight front edges forming an apex, said cross-piece or frog having its lower or outer face beveled toward its front or apex, substantially as and for the purpose described.

In testimony that I claim the foregoing as my own I have hereto affixed my signature in the presence of two witnesses.

MATHEW WALTON LOWES.

Witnesses:
HIRAM ECKERT,
ADAM SCOTT.